United States Patent
Bertz et al.

(10) Patent No.: US 9,609,489 B2
(45) Date of Patent: Mar. 28, 2017

(54) DISTRIBUTION OF MEDIA CONTENT IDENTIFIERS TO WIRELESS COMMUNICATION DEVICES

(71) Applicant: Sprint Communications Company L.P., Overland Park, KS (US)

(72) Inventors: Lyle T. Bertz, Lee's Summit, MO (US); Michael Scott Probasco, Bedford, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 95 days.

(21) Appl. No.: 14/522,926

(22) Filed: Oct. 24, 2014

(65) Prior Publication Data

US 2016/0119763 A1    Apr. 28, 2016

(51) Int. Cl.
*H04H 1/00* (2006.01)
*H04J 3/24* (2006.01)
(Continued)

(52) U.S. Cl.
CPC ........... *H04W 4/08* (2013.01); *H04L 61/3015* (2013.01); *H04L 65/4076* (2013.01);
(Continued)

(58) Field of Classification Search
CPC ... H04W 4/08; H04W 76/002; H04W 76/021; H04W 92/24; H04L 61/3015;
(Continued)

(56) References Cited

U.S. PATENT DOCUMENTS

| 6,822,957 B1 | 11/2004 | Schuster et al. |
| 7,724,688 B2 | 5/2010 | Yamada et al. |

(Continued)

FOREIGN PATENT DOCUMENTS

| CN | 101674288 | 3/2010 |
| EP | 2012501 | 1/2009 |

(Continued)

OTHER PUBLICATIONS

"3rd Generation Partnership Project; Technical Specification Group Services and System Aspects; Multimedia Broadcast/Multicast Service (MBMS); Protocols and codecs (Release 12);" 3GPP TS 26.346 V12.3.0; Sep. 2014; pp. 1-201; 3GPP Organizational Partners; Valbonne, France.

*Primary Examiner* — Chuong T Ho (57) ABSTRACT

A data network receives data associating media content identifiers with a content network identifier and a content user identifier. A wireless network receives a registration indicating the content network identifier and the content user identifier and transfers the content network identifier and the content user identifier to the data network. The data network identifies the media content identifiers associated with the content network identifier and the content user identifier and transfers the media content identifiers to the wireless communication network. The wireless network receives a media request from a wireless communication device indicating the content network identifier and the content user identifier. The wireless network transfers the media content identifiers associated with content network identifier and the content user identifier to the wireless communication device.

18 Claims, 11 Drawing Sheets

(51) Int. Cl.
*H04W 4/08* (2009.01)
*H04L 29/06* (2006.01)
*H04L 29/08* (2006.01)
*H04L 29/12* (2006.01)
*H04W 76/00* (2009.01)
*H04W 76/02* (2009.01)
*H04W 92/24* (2009.01)

(52) U.S. Cl.
CPC ...... *H04L 65/4084* (2013.01); *H04L 67/2814* (2013.01); *H04L 67/327* (2013.01); *H04W 76/002* (2013.01); *H04W 76/021* (2013.01); *H04W 92/24* (2013.01)

(58) Field of Classification Search
CPC ............... H04L 67/327; H04L 65/4076; H04L 67/2814; H04L 65/4084
USPC ........ 370/312, 352, 400, 401; 709/203, 204, 709/217, 218, 219, 224
See application file for complete search history.

(56) References Cited

U.S. PATENT DOCUMENTS

| | | | |
|---|---|---|---|
| 7,787,818 B2 | 8/2010 | Shapiro et al. | |
| 7,962,580 B2 | 6/2011 | Gagliardi et al. | |
| 8,010,626 B2 | 8/2011 | Yue et al. | |
| 8,112,531 B2 | 2/2012 | Walsh et al. | |
| 8,140,701 B2 | 3/2012 | Rajan | |
| 8,200,810 B2 | 6/2012 | Gagliardi et al. | |
| 8,498,628 B2 | 7/2013 | Shapiro et al. | |
| 8,509,241 B2 | 8/2013 | Li et al. | |
| 8,516,529 B2 | 8/2013 | Lajoie et al. | |
| 8,576,846 B2 | 11/2013 | Kumar et al. | |
| 8,621,106 B2 | 12/2013 | Gagliardi et al. | |
| 8,665,873 B2 | 3/2014 | Sarikaya et al. | |
| 8,700,728 B2 | 4/2014 | Luna et al. | |
| 8,719,876 B2 | 5/2014 | Kotecha et al. | |
| 8,761,056 B2 | 6/2014 | Hyun et al. | |
| 8,799,480 B2 | 8/2014 | Kovvali et al. | |
| 8,954,528 B2 * | 2/2015 | Shiina | G06F 17/30235 709/203 |
| 2003/0037139 A1 | 2/2003 | Shteyn | |
| 2008/0242290 A1* | 10/2008 | Bhatia | H04L 12/5895 455/422.1 |
| 2009/0178091 A1 | 7/2009 | Miyamoto et al. | |
| 2010/0130122 A1 | 5/2010 | Sridhar et al. | |
| 2012/0005372 A1 | 1/2012 | Sarikaya et al. | |
| 2012/0184258 A1 | 7/2012 | Kovvali et al. | |
| 2012/0226770 A1 | 9/2012 | Schapira et al. | |
| 2012/0239785 A1 | 9/2012 | Pazos | |
| 2012/0246273 A1 | 9/2012 | Bornstein et al. | |
| 2012/0246480 A1 | 9/2012 | Selander et al. | |
| 2013/0227284 A1 | 8/2013 | Pfeffer et al. | |
| 2014/0052824 A1 | 2/2014 | Fall | |
| 2014/0179301 A1 | 6/2014 | Harris | |
| 2014/0192697 A1 | 7/2014 | Anchan et al. | |
| 2015/0046951 A1* | 2/2015 | Arunachalam | H04N 21/8586 725/59 |
| 2016/0029048 A1* | 1/2016 | Malone | H04N 21/237 725/34 |

FOREIGN PATENT DOCUMENTS

| | | |
|---|---|---|
| EP | 2716011 | 12/2012 |
| EP | 2744168 | 6/2014 |
| WO | 2008115142 | 9/2008 |
| WO | 2012167106 | 12/2012 |
| WO | 2013113181 | 8/2013 |
| WO | 2013120356 | 8/2013 |
| WO | 2013134211 | 9/2013 |

* cited by examiner

DISTRIBUTION OF MEDIA CONTENT IDENTIFIERS TO WIRELESS COMMUNICATION DEVICES

TECHNICAL BACKGROUND

Universal Plug and Play (uPnP) systems allow users to conveniently install and interface numerous data processing products. A user may plug various uPnP devices into a power source and allow the user devices to discover and automatically interface with one another. For example, the user may plug media servers and media clients into their Local Area Network (LAN) and allow the media servers and clients to find each other and exchange media inventory, requests, and content. The Digital Living Network Alliance (DLNA) certifies various user media devices as complying with their uPnP specifications.

Content Delivery Networks (CDNs) also transfer media content, such as video, audio, graphics, and data objects for delivery to various end-user devices. In many content-delivery architectures, two CDNs are used—one for the content source and another for the content destination. These two CDNs exchange data to dynamically distribute media content from source to destination. The data interactions between CDNs are directed by Content Delivery Network Interface (CDNI) standards. CDNI specifies operations like control, logging, prepositioning, inventory, and footprint discovery. The footprint discovery uses Footprint and Capabilities Interface (FCI) data that describes the IP address ranges served by the CDNs.

Some CDNs use wireless communication networks to deliver their media content to user devices like televisions, computers, and phones. Many of these wireless networks have enhanced Multimedia Broadcast Multicast Service (eMBMS) systems to wirelessly multicast high-consumption media content. The CDNs may use these wireless network eMBMS systems to deliver their media content. Unfortunately, wireless communication networks and CDNs do not interface with user devices and their associated uPnP systems in an efficient and effective manner. In particular, the CDNs and eMBMS systems do not effectively interact with user wireless devices and media servers that have uPnP media capability.

TECHNICAL OVERVIEW

A data network receives data associating media content identifiers with a content network identifier and a content user identifier. A wireless network receives a registration indicating the content network identifier and the content user identifier and transfers the content network identifier and the content user identifier to the data network. The data network identifies the media content identifiers associated with the content network identifier and the content user identifier and transfers the media content identifiers to the wireless communication network. The wireless network receives a media request from a wireless communication device indicating the content network identifier and the content user identifier. The wireless network transfers the media content identifiers associated with content network identifier and the content user identifier to the wireless communication device.

DETAILED DESCRIPTION

Figure 1:
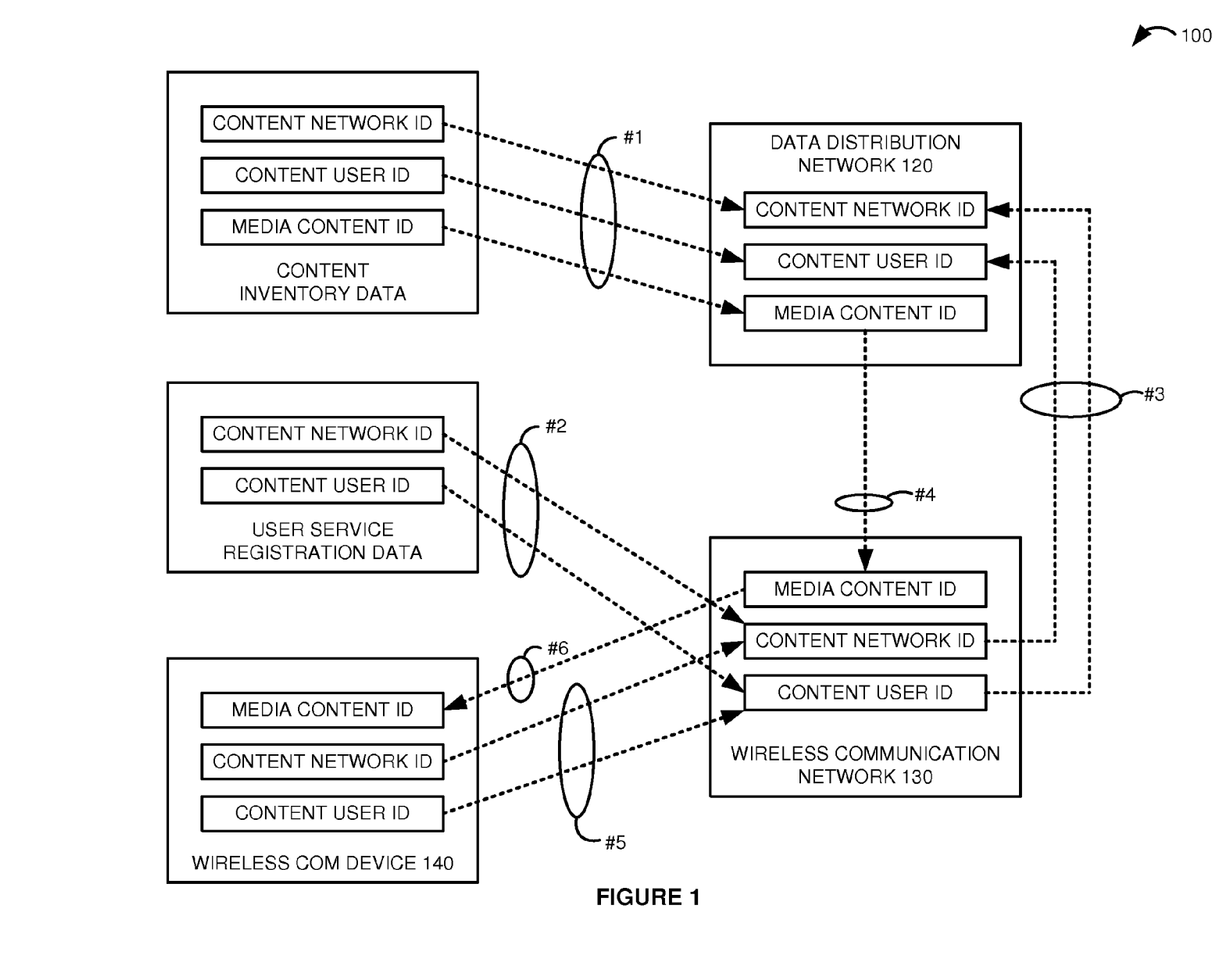
FIGS. 1-2 illustrate a communication system to transfer media content identifiers to a wireless communication device.
Figure 2:
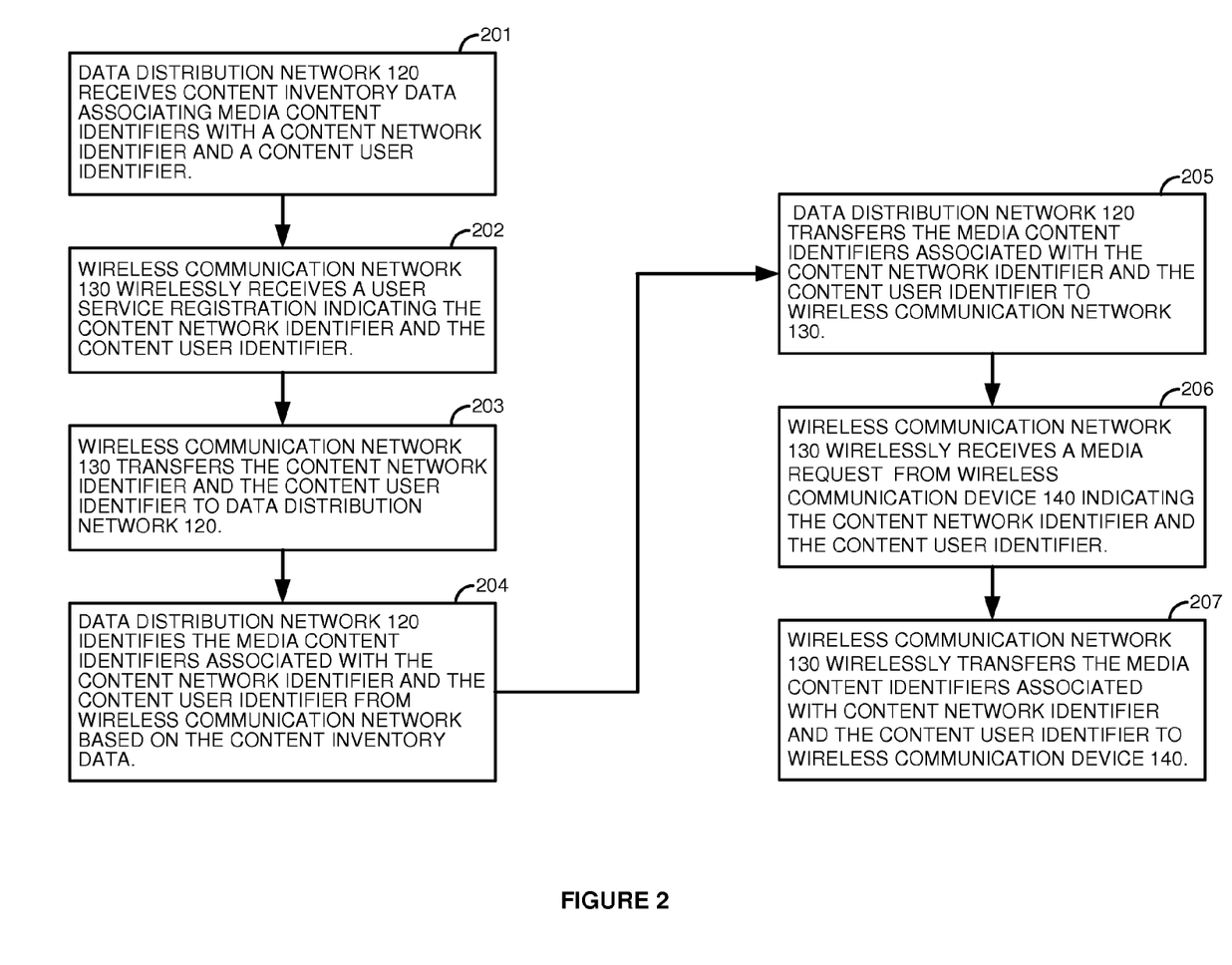

FIGS. 1-2 illustrate communication system 100 to transfer media content identifiers to wireless communication device 140. Referring to FIG. 1, communication system 100 comprises data distribution network 120, wireless communication network 130, and wireless communication device 140. Data distribution network 120 comprises modems, routers, gateways, servers, communication controllers and databases, and/or some other content-delivery network elements. Wireless communication network 130 comprises wireless base stations, routers, gateways, media controllers and databases, mobility management systems, multicast coordination systems, and/or some other communication network elements. Wireless communication device 140 comprises a phone, computer, media player, or some other apparatus having radio and data capability.

Data distribution network 120 and wireless communication network 130 communicate over data communication links that use IP, CDNI, and/or some other data protocol. Wireless communication network 130 and wireless communication device 140 communicate over wireless communication links that use LTE, Wireless Fidelity (Wifi), and/or some other wireless protocol. These wireless communication links use the wireless protocols (LTE, Wifi, other) to transport the data protocols (IP, CDNI, other). Data distribution network 120 and wireless communication network 130 typically communicate with many other systems over various communication interfaces including the Internet. These communication links and interfaces may be direct or may comprise various intermediate devices, systems, and networks.

Communication system 100 stores, associates, and transfers various data including content network identifiers (IDs), content user IDs, media content IDs, and media content. The media content comprises video, audio, graphics, data files, data objects, and/or some other block of data. The media content IDs comprise uniform resource IDs, data object IDs, data addresses, storage locations, or some other suitable code. The content network IDs comprise data strings that identify individual content delivery networks within a larger content-delivery infrastructure. The content delivery networks may be small or large and include media servers, controllers, and the like. The content user IDs identify individual consumers of the media content and comprise device numbers, account codes, user names, and the like.

In a first operation (#1), data distribution system 120 receives, associates, and stores content inventory data that comprises a content network ID, content user ID, and media content ID. The content inventory data was generated by a user communication system (or proxy) that regularly collects and registers content inventory data with data distribution system 120 over the Internet or some other data communication network.

In a second operation (#2), wireless communication network 130 wirelessly receives user service registration data indicating the same content network ID and the same content user ID received by data distribution network 120. The user service registration data was generated by a user communication system (or proxy) that regularly attaches and communicates over wireless communication network 130. The user communication system that sends the content inventory data to data distribution system 120 may be the same as the user communication system that sends the user service registration data to wireless communication network 130.

In a third operation (#3) and in response to the user service registration, wireless communication network 130 transfer the content network ID and the content user ID to the data distribution network 120.

In a fourth operation (#4), data distribution network 120 receives the content network ID and the content user ID sent from wireless communication network 130. Data distribution network 120 responsively identifies the media content ID based on its association with the same content network ID and the same content user ID in both the content inventory data and the user service registration. Data distribution network 120 transfers the media content ID associated with the content network ID and the content user ID for delivery to wireless communication network 130.

In a fifth operation (#5), wireless communication network 130 wirelessly receives a media request having the content network ID and the content user ID sent from wireless communication device 140. These content IDs may be sent responsive to wireless attachment, application launch, user instruction, or some other trigger.

In a sixth operation (#6), wireless communication network 130 responsively identifies the media content ID based on its association with the same content network ID and the same content user ID in both the media request, the user service registration, and the content inventory data. Wireless communication network 130 transfers the media content ID associated with the content network ID and the content user ID for delivery to wireless communication device 140.

A multitude of additional media content identifiers could be delivered to wireless communication device 140 or other user devices in a similar manner based on numerous content network IDs and content user IDs. As desired, additional layers of security and restricted access to media content identifiers could be implemented.

Referring to FIG. 2, the operation of communication system 100 is described. Data distribution network 120 receives content inventory data associating media content identifiers with a content network identifier and a content user identifier (201). Wireless communication network 130 wirelessly receives a user service registration indicating the content network identifier and the content user identifier (202). Wireless communication network 130 responsively transfers the content network identifier and the content user identifier to data distribution network 120 (203).

Data distribution network 120 responsively identifies the media content identifiers associated with the content network identifier and the content user identifier based on the content inventory data (204). Data distribution network 120 transfers the media content identifiers associated with the content network identifier and the content user identifier to wireless communication network 130 (205). Wireless communication network 130 wirelessly receives a media request from wireless communication device 140 indicating the content network identifier and the content user identifier (206). Wireless communication network 130 responsively transfers the media content identifiers associated with content network identifier and the content user identifier to wireless communication device 140 (207).

Advantageously, communication system 100 wirelessly distributes media content identifiers content to user devices in a robust manner based on complex combinations of media content IDs, content network IDs, and content user IDs. As desired, additional layers of security and restricted access to media content identifiers could be implemented.

Figure 3:
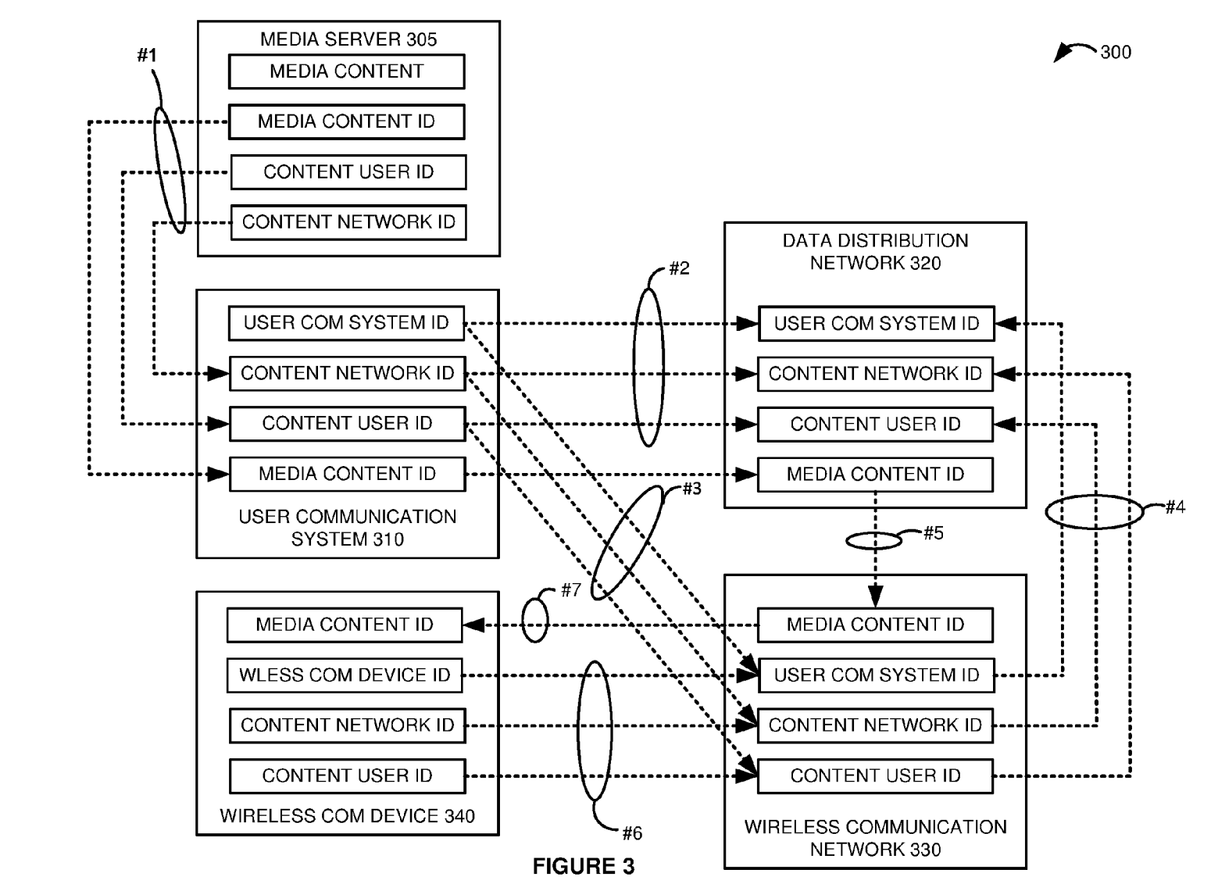
FIGS. 3-4 illustrate a communication system to transfer media content identifiers and media content to a wireless communication device through a user communication system.
Figure 4:
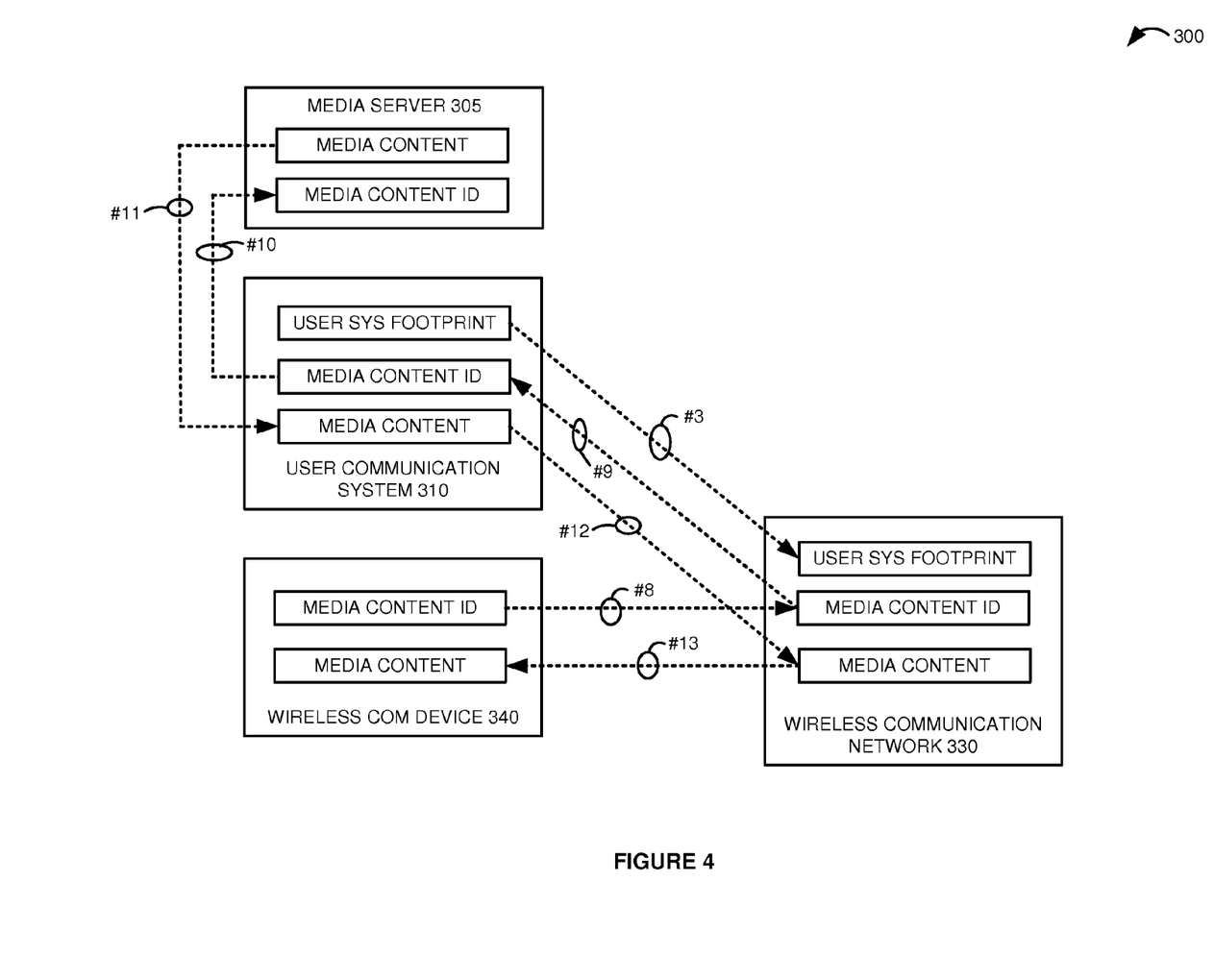

FIGS. 3-4 illustrate communication system 300 to transfer media content IDs and media content to wireless communication device 340 through user communication system 310. Communication system 300 is an example of communication system 100, although system 100 may have alternative configurations and operations. Referring to FIG. 3, communication system 300 comprises media server 305, user communication system 310, data distribution network 320, wireless communication network 330, and wireless communication device 340.

Media server 305 comprises computer and communications circuitry, memory, and software. Media server 305 and user communication system 310 communicate over a Local Area Network (LAN) or some other communication system. In some examples, media server 305 is a universal plug and play network-attached storage device with media serving logic. Media server 305 stores media content and an associated media content ID, content user ID, and content network ID. Note that media content may be associated with various media content IDs, content user IDs, and content network IDs that are not shown for clarity. Likewise, media server 305 typically stores additional media content that is not shown for clarity.

User communication system 310 comprises computer and communications circuitry, memory, and software. User communication system 310 has a user communication system ID such as an address, serial number, signature, and the like. User communication system 310 and data distribution network 320 communicate over data communication links that use IP, CDNI, and/or some other data protocol. User communication system 310 and wireless communication network 330 communicate over wireless communication links that use LTE, Wireless Fidelity (Wifi), and/or some other wireless protocol to transport the data protocols (IP, CDNI, other). User communication system 310 and wireless communication network 330 may also communicate over data communication links that use IP or some other data protocol. In some examples, user communication system 310 comprises an LTE femtocell.

Wireless communication device 340 has a wireless communication device ID, such as an address, serial number, signature, and the like. Wireless communication network 330 associates the wireless communication device ID for wireless communication device 340 with the user communication system ID for user communication system 310. The association may be based on a multi-device media access plan.

In a first operation (#1), media server 305 transfers the media content ID, content network ID, and content user ID for its current content to user communication system 310. This data transfer may be a push and/or pull and typically occurs on a frequent basis.

In a second operation (#2), user communication system 310 transfers its own user communication device ID along with the media content ID, content network ID, and content user ID to data distribution network 320. Data distribution system 320 receives, associates, and stores content inventory data that comprises the user communication system device ID, content network ID, content user ID, media content ID.

In a third operation (#3), user communication system 310 transfers its own user communication system ID along with the content network ID and content user ID to wireless communication network 330 in a user service registration.

In a fourth (#4) and in response to the user service registration, wireless communication network 330 transfers the user communication system ID, content network ID, and content user ID to the data distribution network 320.

In a fifth operation (#5), data distribution network 320 receives the user communication system ID, content network ID and the content user ID sent from wireless communication network 330. Data distribution network 320 responsively identifies the media content ID based on its association with the same user communication system ID, same content network ID, and same content user ID in both the content inventory data and the user service registration. Data distribution network 320 transfers the media content ID associated with the user communication system ID, content network ID, and content user ID for delivery to wireless communication network 330.

In a sixth operation (#6), wireless communication network 330 wirelessly receives a media request having the wireless communication device ID, content network ID, and content user ID from wireless communication device 340. These IDs may be sent responsive to wireless attachment, application launch, user instruction, or some other trigger.

In a seventh operation (#7), wireless communication network 330 responsively identifies the media content ID based on its association with the same content network ID and the same content user ID in both the media request, the user service registration, and the content inventory data. In addition, wireless communication network 330 enforces security by transferring the media content ID only if the wireless communication device ID from the media request is associated with the user communication ID from the user service registration and the content inventory data. In this example, wireless communication network 330 already associates the wireless communication device ID for device 340 with the user communication ID for system 310, so the media content identifier is transferred by network 330 to wireless communication device 340.

Referring to FIG. 4, the third operation (#3) of FIG. 3 is updated with user communication system 310 transferring its content-delivery footprint data to wireless communication network 330 in the user service registration. The content-delivery footprint data indicates the IP network addresses served by communication system 330. In some examples, the footprint data indicates the IP address allocations and translations that occur within wireless communication network 330 and user communication device 310. Wireless communication network 330 associates the footprint data with the media content ID based on their common association with the same communication system ID, content network ID, and content user ID.

In an eighth operation (#8), wireless communication device 340 transfers a content request indicating the media content ID to wireless communication network 330. Like the media request, additional layers of data and security could be implemented for the content request.

In a ninth operation (#9), wireless communication network 330 identifies a network address for the media content indicator based on the footprint data associated with the media content indicator. For example, a public network address is identified that will translate through wireless communication network 330 and wireless communication system 310 to transfer the requested media content ID to media server 305. Wireless communication network 330 transfers the media content ID with the network address to user communication system 310.

In an alternative, the ninth operation (#9) is modified where wireless communication network 330 returns a redirect request with the network address for the media content ID to wireless communication device 340. Wireless communication device 340 then retrieves the media content from media server 305 over wireless communication system 330 and user communication system 310 using the network address and the media content ID.

In a tenth operation (#10), user communication system 310 processes the network address using its translations to transfer the media content ID to media server 305. In an eleventh operation (#11), media server 305 transfers the media content to user communication system 310 based on the media content identifier and media request. In a twelfth operation (#12), user communication system 310 transfers the media content to wireless communication network 330 based on the media request. In a thirteenth operation (#13), wireless communication network 330 transfers the media content to wireless communication device 340 responsive to the media request.

Note that additional messaging and CDNI data exchange may occur to facilitate the transfer. Also note that a server ID for media server 305 could be used in a similar manner to the content network IDs in the above examples.

Advantageously, communication system 300 wirelessly distributes media content identifiers and media content to user devices in a robust manner based on complex combinations of footprint data, media content IDs, user communication system IDs, content network IDs, and content user IDs. As desired, additional layers of security and restricted access to media content identifiers could be implemented.

FIG. 5-8 illustrate communication system 500 to distribute media Uniform Resource Identifiers (URIs) and associated media content to various user devices. Communication system 500 comprises a Long Term Evolution (LTE) network, Content Delivery Network (CDN), and user equipment. The user equipment includes: a wireless hotspot, Local Area Network (LAN), media servers, media renderers, IP routers/modems, and other user devices.

Figure 5:
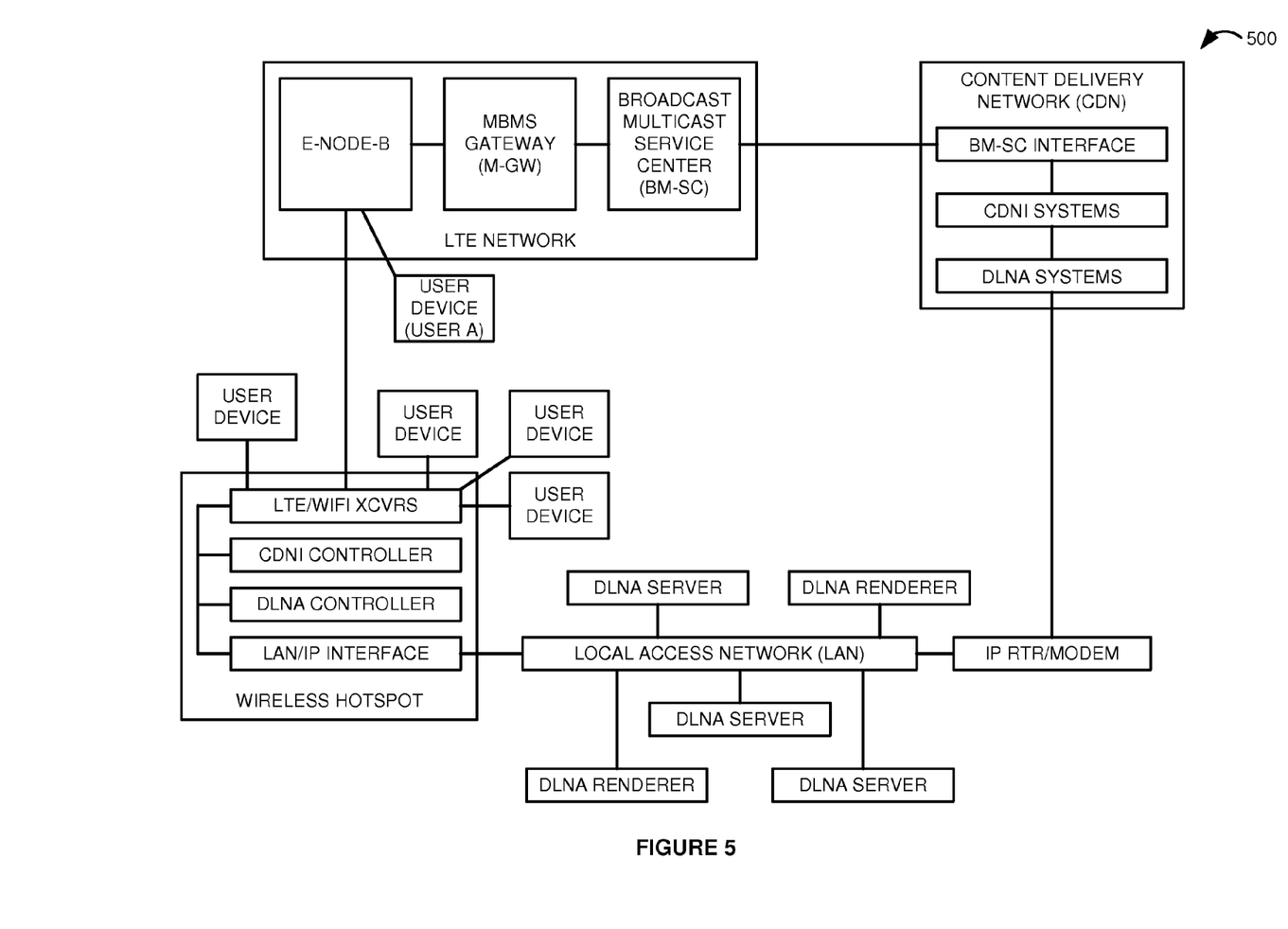
FIGS. 5-8 illustrate communication system 500 to distribute media Uniform Resource Identifiers (URIs) and associated media content to various user devices.

The media servers and renderers comprise Digital Living Network Alliance (DLNA) systems. The DLNA servers obtain media content from various sources. The DLNA renderers obtain the media content from the DLNA servers for presentation to DLNA users. The user devices are also DNLA capable with controller, server, and/or renderer functionality for the DLNA users. The servers, renderers, and users have associated DLNA server, renderer, and user IDs. Various combinations of DLNA servers form DLNA networks that have DLNA network IDs.

The wireless hotspot comprises LTE/Wifi transceivers, a CDNI controller, DLNA controller, and LAN/IP interface. The LTE network comprises an eNodeB, Multimedia Broadcast Multicast System (MBMS) Gateway (M-GW), and Broadcast Multicast Service Center (BM-SC). The CDN comprises a BM-SC interface, CDNI systems, and DLNA control systems.

Figure 6:
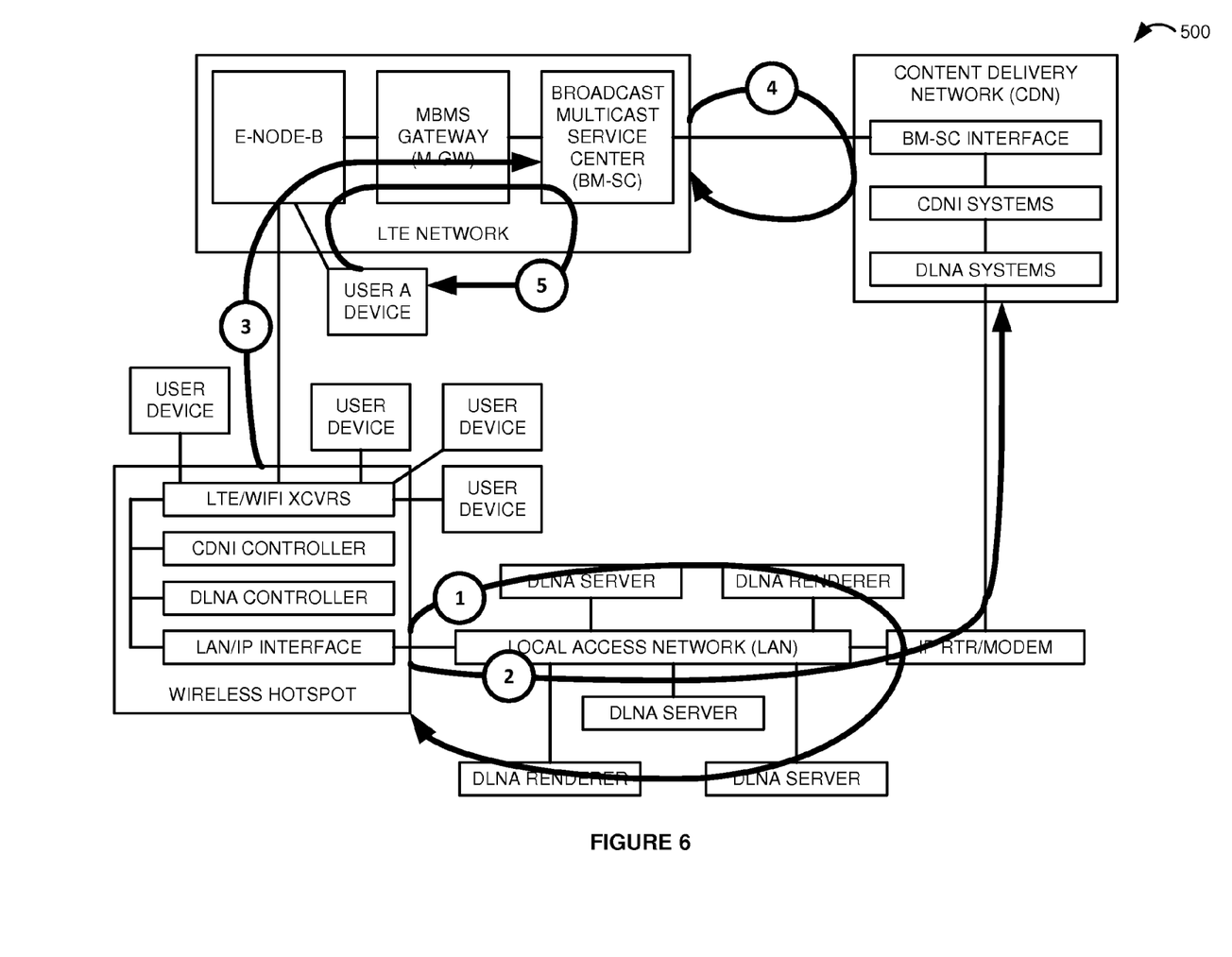

Referring to FIG. 6, the DLNA controller in the wireless hotspot initially discovers DLNA servers, renderers, and other devices over the LAN and the LTE/Wifi transceivers. The wireless hotspot obtains DLNA data including DLNA network IDs, server IDs, user IDs. The wireless hotspot obtains URIs for media content hosted by the DLNA servers and also obtains additional metadata including media usage and transfer records.

Second, the wireless DLNA controller in the wireless hotspot transfers the DLNA data (network IDs, server IDs, user IDs, URIs, usage/transfer records) to the DLNA systems in the CDN.

Third, the CDNI controller in the wireless hotspot gathers DLNA network, server, and user IDs. The CDNI controller also gathers Footprint and Capabilities Interface (FCI) data for the hotspot including IP allocations and translations in itself and the LTE network, supported CDNI capabilities, and the like. The CDNI controller in the wireless hotspot registers with the BM-SC in the LTE network. The CDNI controller transfers the DLNA IDs and the FCI data to the BM-SC in this eMBMS registration along with the device identifier for the wireless hotspot.

Fourth, the BM-SC transfers the hotspot device identifier, DLNA IDs, and FCI data to the BM-SC interface in the CDN. The CDNI systems in the CDN identify media content URIs for various DLNA networks, servers, and users from its DLNA data based on common associations with the hotspot device IDs and DLNA IDs. The CDNI systems may also process usage and transfer records to identify additional media content URIs to pre-position the DLNA networks, servers, and users. The CDN returns the media content URIs for the DLNA networks, servers, and users to the BM-SC.

Fifth, the user device operated by User A transfers a media request to the BM-SC indicating a user device ID, DLNA network ID, and DLNA user ID. This data may be sent responsive to wireless attachment, application launch, user instruction, or some other trigger. The BM-SC identifies media content URIs for User A based on URI association with the common DLNA network ID and DLNA user ID. A layer of security is applied by verifying an LTE network association between the hotspot ID and user device ID. The BM-SC sends the identified media content URIs for User A to the user device operated by User A.

Figure 7:
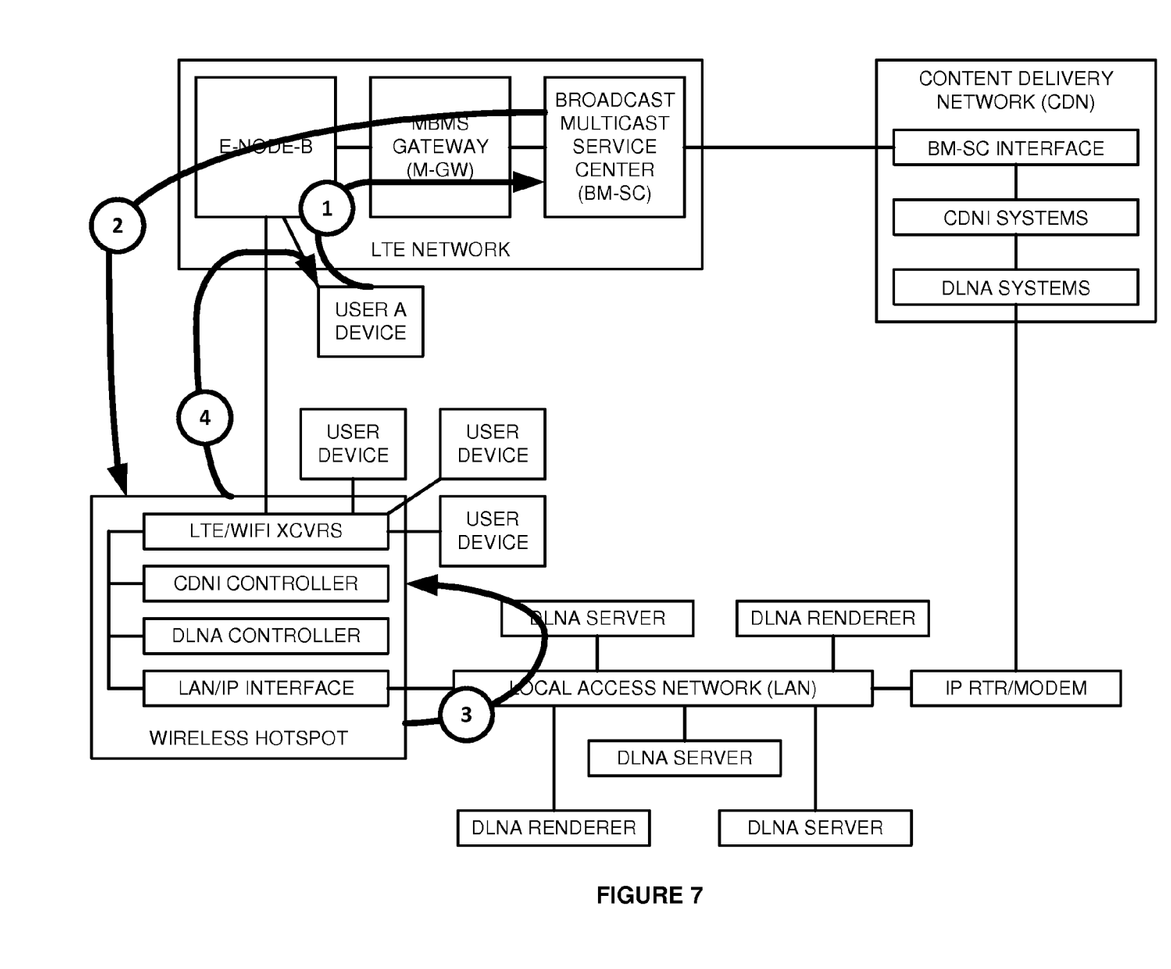

Referring to FIG. 7, operations continue after the URI distribution of FIG. 6, but the operations are renumbered for clarity. First, the device operated by User A transfers one of the URIs to the BM-SC (or some other LTE system like a gateway). Second, the BM-SC identifies an IP prefix for the URI based on the footprint data that is associated with the hotspot ID that is associated with the DLNA IDs that are associated with the URI. For example, a network address is identified that will translate through the LTE network and the wireless hotspot to the appropriate DLNA network and server. The BM-SC transfers the IP prefix and URI to the CDNI controller and on to the DLNA controller in the wireless hotspot. Third, the DLNA controller in the wireless hotspot transfers the URI to the appropriate DLNA server. The DLNA server returns the media content for the URI to the DLNA controller in the wireless hotspot. Fourth, the CDNI controller in the wireless hotspot transfers the media content for the URI over the LTE network to the device for User A. Additional CDNI request routing data may be exchanged to facilitate this transfer.

Figure 8:
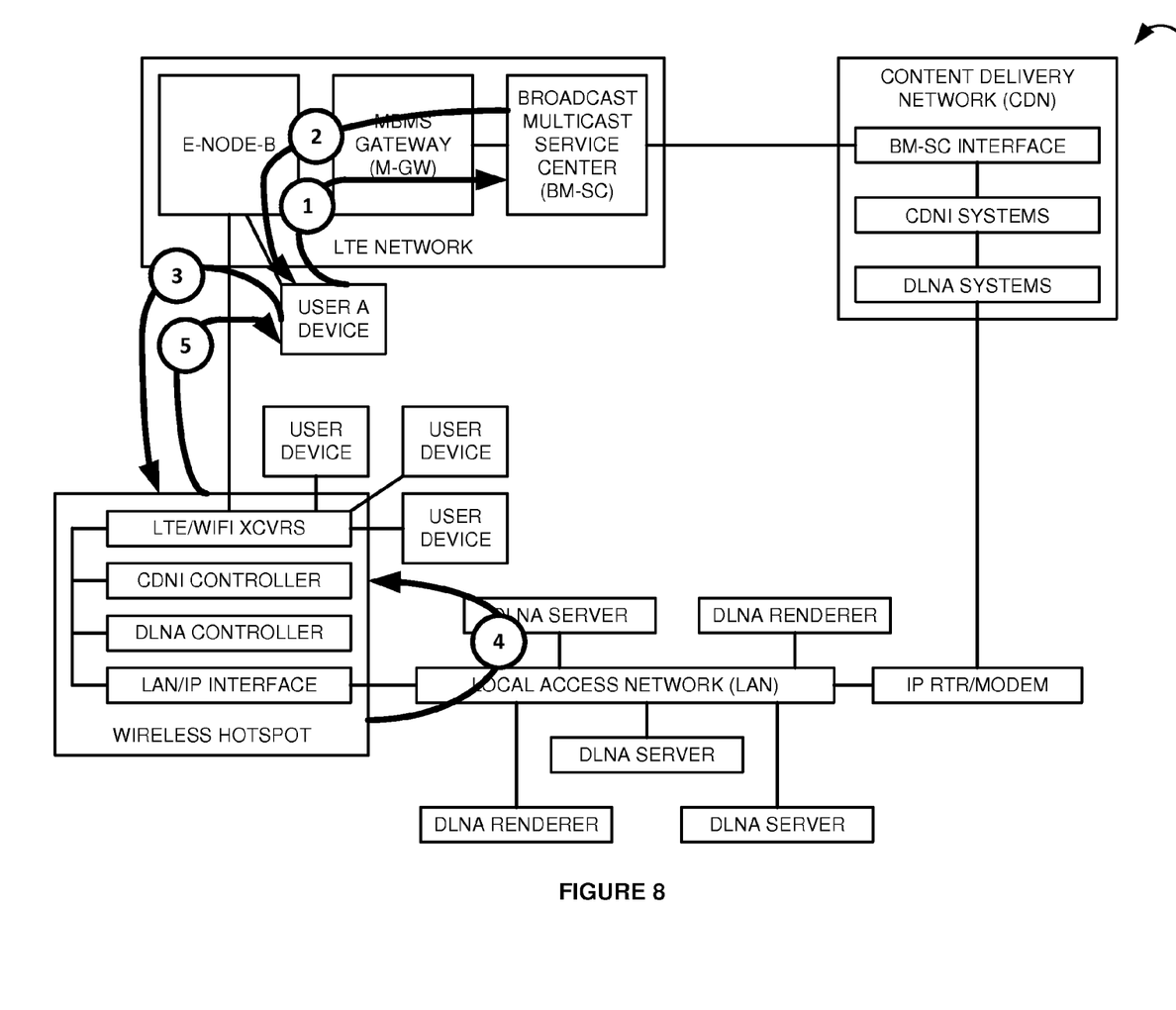

Referring to FIG. 8, operations continue after the URI distribution of FIG. 6, but the operations are renumbered for clarity. First, the device operated by User A transfers one of the URIs to the BM-SC (or some other LTE system like a gateway). Second, the BM-SC identifies an IP prefix for the URI based on the footprint data that is associated with the hotspot ID that is associated with the DLNA IDs that are associated with the URI. For example, a network address is identified that will translate through the LTE network and the wireless hotspot to the appropriate DLNA server. The BM-SC transfers the IP prefix and URI to the device of User A in a redirect request. Third, the device for User A transfers the URI to the DLNA controller in the wireless hotspot through the LTE network, hotspot transceivers, and CDNI controller. Fourth, the DLNA controller in the wireless hotspot transfers the URI to the appropriate DLNA server. The DLNA server returns the media content for the URI to the DLNA controller in the wireless hotspot. Fifth, the CDNI controller in the wireless hotspot transfers the media content for the URI over the LTE network to the device for User A. Additional CDNI request routing data may be exchanged to facilitate this transfer.

Advantageously, communication system 500 wirelessly distributes URIs and associated media content to user devices in a robust manner based on complex combinations of the URIs with IP address translations, Hotspot IDs, DLNA network IDs, DLNA server IDs, and DLNA user IDs. As desired, additional layers of security and restricted access to the URIs could be implemented. For example, wireless network records associating multiple user devices may be used to securely screen requests for the user's CDN URIs. Communication system 500 efficiently associates DLNA data from frequent uPnP device feeds to the CDN with periodic wireless network registration data to associate the CDN URIs for a user with their current wireless communication devices of choice.

Figure 9:
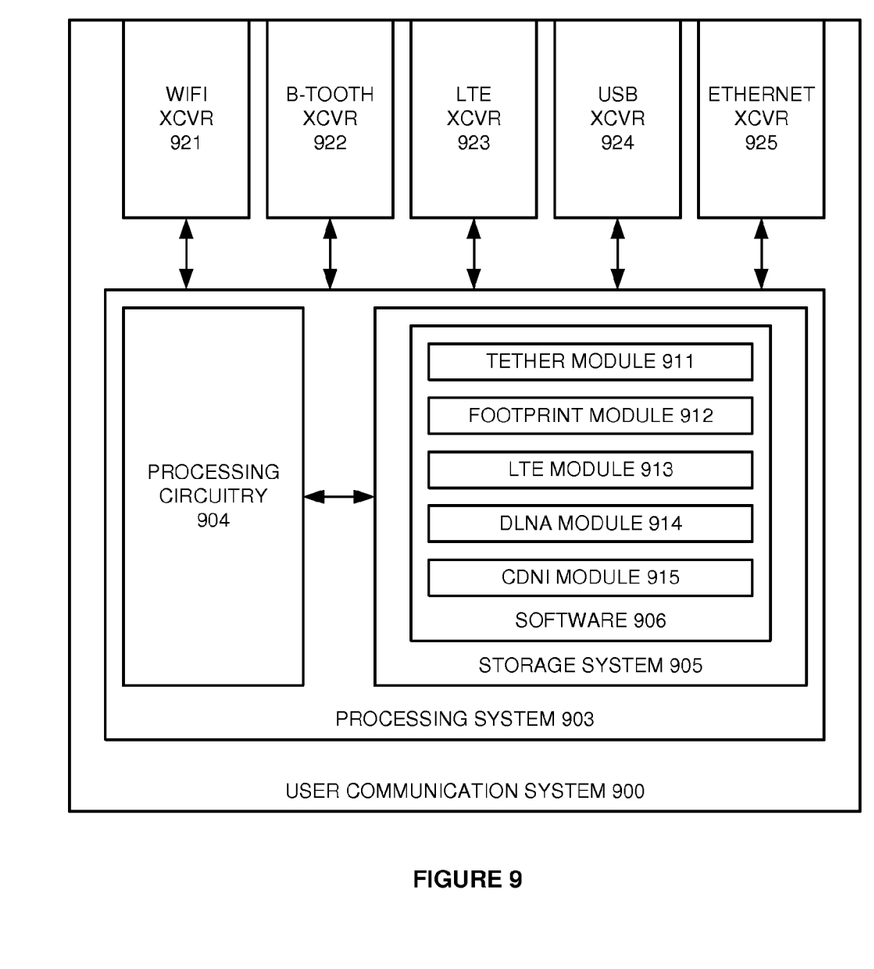
FIG. 9 illustrates a user communications system to distribute media content identifiers to user devices.

FIG. 9 illustrates user communications system 900 to distribute media content identifiers to user devices. User communications system 900 is an example of user communication system 310 and the wireless hotspot, although these systems may use alternative configurations and operations. User communications system 900 comprises Wifi transceiver 921, Bluetooth transceiver 922, LTE transceiver 923, Universal Serial Bus (USB) transceiver 924, and Ethernet transceiver 925. Communication transceivers 921-925 comprise communication components, such as antennas, ports, amplifiers, filters, modulators, signal processors, and the like.

User communications system 900 comprises processing system 903. Processing system 903 comprises processing circuitry 904 and storage system 905. Storage system 905 stores software 906. Software 906 includes software modules 911-915. Some conventional aspects of user communication system 900 are omitted for clarity, such as power supplies, enclosures, and the like. User communication system 900 may be centralized or distributed and may include various virtualized components.

In processing system 903, processing circuitry 904 comprises circuit boards, integrated circuitry, and associated electronics. Storage system 905 comprises non-transitory, machine-readable, data storage media, such as flash drives, disc drives, memory circuitry, servers, and the like. Software 906 comprises machine-readable instructions that control the operation of processing circuitry 904 when executed. Software 906 includes software modules 911-915 and may also include operating systems, applications, data structures, virtual machines, utilities, databases, and the like. All or portions of software 906 may be externally stored on one or more storage media, such as flash drives, discs, servers, and the like.

When executed by processing circuitry 904, tether module 911 directs circuitry 904 to establish tether connections for user devices over transceivers 921-925. When executed by processing circuitry 904, footprint module 912 directs circuitry 904 to obtain and report IP address allocation and translation data, CDNI data, and the like for itself and access networks. When executed by processing circuitry 904, LTE module 913 directs circuitry 904 to attach, register, and exchange data with LTE networks. When executed by processing circuitry 904, DLNA module 914 directs circuitry 904 to gather DLNA data and content from networked or tethered DLNA systems. When executed by processing circuitry 904, CDNI module 915 directs circuitry 904 to transfer CDNI signaling including FCI data, DLNA data, and hotspot data to CDNs and BM-SCs.

Figure 10:
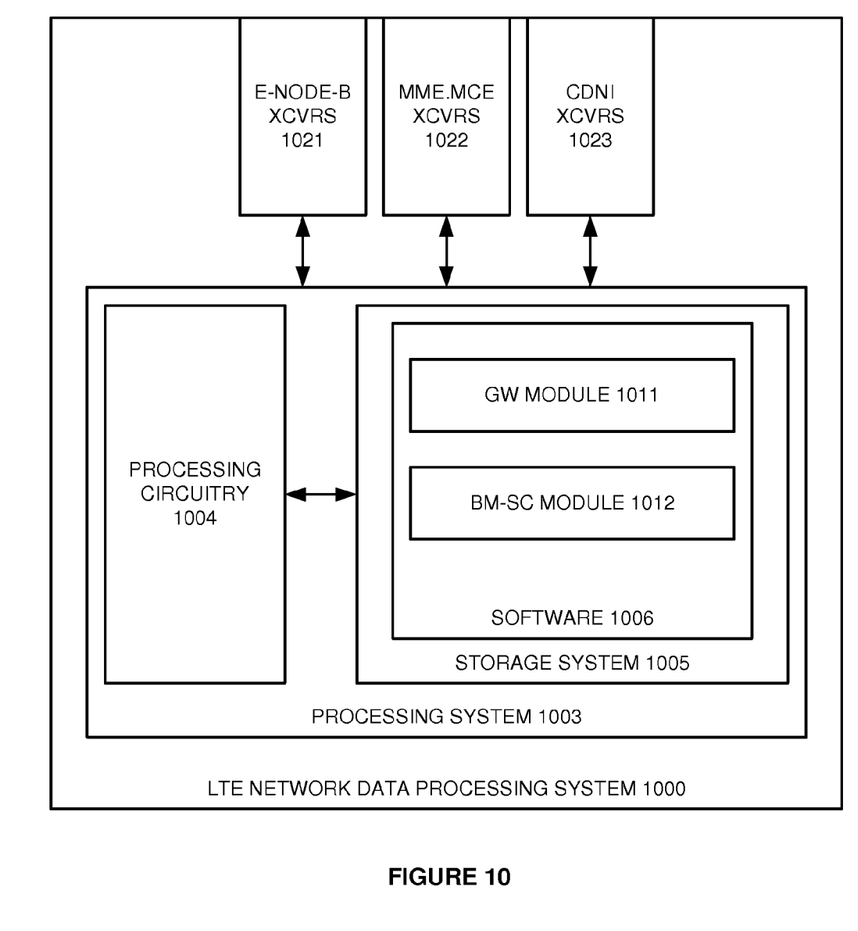
FIG. 10 illustrates an LTE network data processing system to distribute media content identifiers to user devices.

FIG. 10 illustrates LTE network data processing system 1000 to distribute media content identifiers to user devices. LTE network data processing system 1000 is an example of wireless communication network 130, wireless communication network 330, and the LTE BM-SC, although these systems may use alternative configurations and operations. LTE network data processing system 1000 comprises LTE eNodeB transceivers 1021, Mobility Management Entity (MME)/Media Control Entity (MCE) transceivers 1022, and CDNI transceivers 1023. Communication transceivers 1021-1023 comprise communication components, such as ports, microprocessors, memory, software, and the like.

LTE network data processing system 1000 comprises processing system 1003. Processing system 1003 comprises processing circuitry 1004 and storage system 1005. Storage system 1005 stores software 1006. Software 1006 includes software modules 1011-1012. Some conventional aspects of LTE network data processing system 1000 are omitted for clarity, such as power supplies, enclosures, and the like. LTE network data processing system 1000 may be centralized or distributed and may include various virtualized components.

In processing system 1003, processing circuitry 1004 comprises circuit boards, integrated circuitry, and associated electronics. Storage system 1005 comprises non-transitory, machine-readable, data storage media, such as flash drives, disc drives, memory circuitry, servers, and the like. Software 1006 comprises machine-readable instructions that control the operation of processing circuitry 1004 when executed. Software 1006 includes software modules 1011-1012 and may also include operating systems, applications, data structures, virtual machines, utilities, databases, and the like. All or portions of software 1006 may be externally stored on one or more storage media, such as flash drives, discs, servers, and the like.

When executed by processing circuitry 1004, gateway module 1011 directs circuitry 1004 to execute LTE multimedia gateway, packet gateway, and service gateway virtual machines. The gateway virtual machines allocate and translate IP addresses. The gateway virtual machines also drive the eMBMS operation of the eNodeBs. When executed by processing circuitry 1004, BM-SC module 1012 directs circuitry 1004 to execute a BM-SC virtual machine. The BM-SC virtual machine controls the eMBMS operation of the gateways and eNodeBs. The BM-SC virtual machine also interacts with CDNs and user systems to make the DLNA and FCI data associations and support the data flows as described herein.

Figure 11:
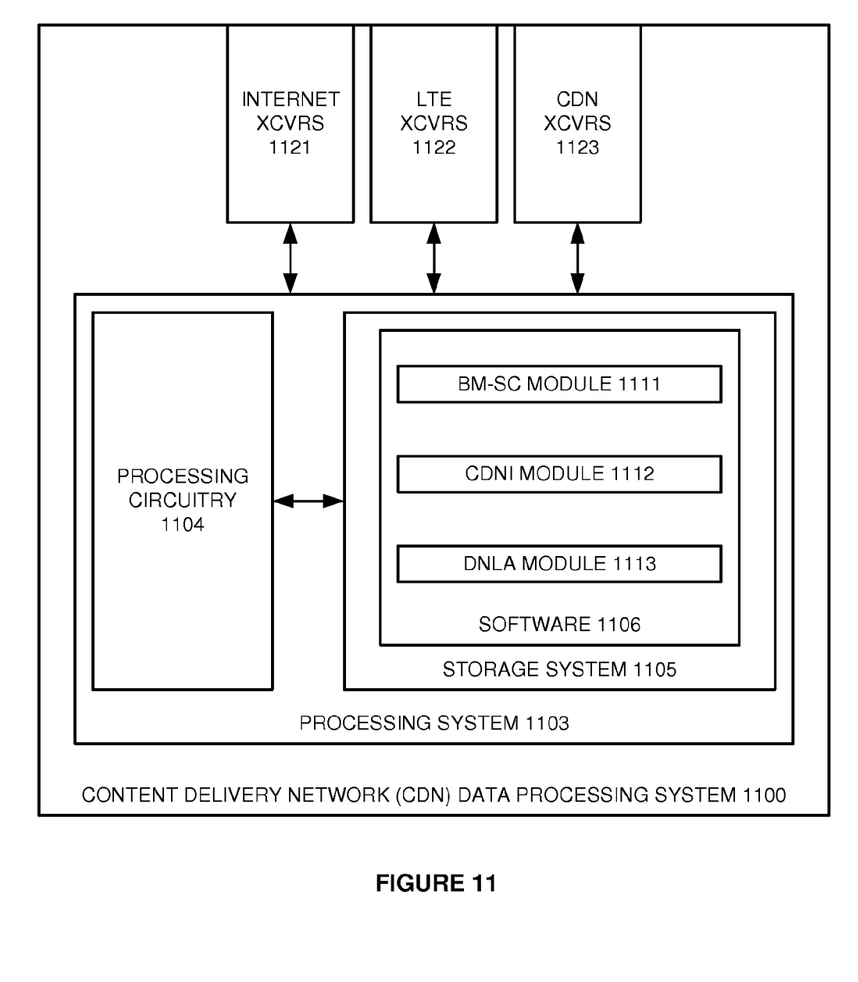
FIG. 11 illustrates a content distribution network data processing system to distribute media content identifiers to user devices.

FIG. 11 illustrates Content Delivery Network (CDN) data processing system 1100 to distribute media content identifiers to user devices. CDN data processing system 1100 is an example of data distribution network 120, data distribution network 320, and the CDN of FIG. 5, although these systems may use alternative configurations and operations. CDN data processing system 1100 comprises Internet transceivers 1121, LTE network transceivers 1122, and CDN transceivers 1123. Communication transceivers 1121-1123 comprise communication components, such as ports, microprocessors, memory, software, and the like.

CDN data processing system 1100 comprises processing system 1103. Processing system 1103 comprises processing circuitry 1104 and storage system 1105. Storage system 1105 stores software 1106. Software 1106 includes software modules 1111-1113. Some conventional aspects of CDN data processing system 1100 are omitted for clarity, such as power supplies, enclosures, and the like. CDN data processing system 1100 may be centralized or distributed and may include various virtualized components.

In processing system 1103, processing circuitry 1104 comprises circuit boards, integrated circuitry, and associated electronics. Storage system 1105 comprises non-transitory, machine-readable, data storage media, such as flash drives, disc drives, memory circuitry, servers, and the like. Software 1106 comprises machine-readable instructions that control the operation of processing circuitry 1104 when executed. Software 1106 includes software modules 1111-1113 and may also include operating systems, applications, data structures, virtual machines, utilities, databases, and the like. All or portions of software 1106 may be externally stored on one or more storage media, such as flash drives, discs, servers, and the like.

When executed by processing circuitry 1104, BM-SC module 1111 directs circuitry 1104 to interface with LTE systems and BM-SCs as described herein to exchange FCI data, DLNA data, and user registration data. When executed by processing circuitry 1104, CDNI module 1112 directs circuitry 1104 to control CDN operations and make the associations between the media content inventory data and the wireless network registration data as described herein. When executed by processing circuitry 1104, DLNA module 1113 directs circuitry 1104 to collect DLNA data indicating media content IDs in association with DLNA network, server, and user IDs as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to wirelessly transfer media content identifiers to a wireless communication device, the method comprising:

in a data distribution network, receiving content inventory data associating the media content identifiers with a content network identifier and a content user identifier;

in a wireless communication network, wirelessly receiving a user service registration indicating the content network identifier, the content user identifier, and content delivery footprint data, and responsively transferring the content network identifier, the content user identifier, and the content delivery footprint data, for delivery to the data distribution network;

in the data distribution network, receiving the content network identifier and the content user identifier and responsively identifying the media content identifiers associated with the content network identifier and the content user identifier by the content inventory data and transferring the media content identifiers associated with the content network identifier and the content user identifier for delivery to the wireless communication network;

in the wireless communication network, receiving the media content identifiers associated with the content network identifier and the content user identifier and associating the content-delivery footprint data for the user communication system with the media content identifiers associated with the content network identifier and the content user identifier; and in the wireless communication network, wirelessly receiving a media request from the wireless communication device indicating the content network identifier and the content user identifier, and in response, wirelessly transferring the media content identifiers associated with content network identifier and the content user identifier to the wireless communication device.

2. The method of claim 1 further comprising:
in the wireless communication network, wirelessly receiving a content request from the wireless communication device indicating one of the media content identifiers; and
responsively identifying a network address for the one of the media content identifiers based on the association of the one of the media content identifiers with the content-delivery footprint data for the user communication system; and
forwarding the content request to the user communication system with the network address and the one of the media content identifiers.

3. The method of claim 1 further comprising:
in the wireless communication network, wirelessly receiving a content request from the wireless communication device indicating one of the media content identifiers;
identifying a network address for the one of the media content identifiers based on the association of the one of the media content identifiers with the content-delivery footprint data for the user communication system; and
transferring a redirect request to the wireless communication device indicating the network address for the one of the media content identifiers.

4. The method of claim 1 wherein the content-delivery footprint data indicates Internet Protocol address translations used in the wireless communication network for the user communication system.

5. The method of claim 1 wherein:
receiving the content inventory data into the data distribution network further comprises receiving the content inventory data transferred by a user communication system and indicating a user communication system identifier associated with the content network identifier;
receiving the user service registration into the wireless access system further comprises receiving the user service registration transferred by the user communication system and indicating the user communication system identifier associated with the content network identifier; and further comprising
transferring the user communication system identifier along with the content network identifier from the wireless communication network for delivery to the data distribution network and receiving the user communication system identifier along with the content network identifier into the data distribution network; and wherein
identifying the media content identifiers in the data distribution network comprises identifying the media content identifiers associated with the user communication system identifier and the content network identifier and the content user identifier.

6. The method of claim 1 further comprising:
in the wireless communication network, associating a user communication system identifier for a user communication system with a wireless communication device identifier for the wireless communication device;
wherein receiving the user service registration comprises receiving the user service registration indicating the user communication system identifier transferred by the user communication system;
in the wireless communication network, associating the user communication system identifier with the media content identifiers based on the content network identifier;
wherein receiving the media request further comprises receiving the media request indicating the wireless communication device identifier transferred by the wireless communication device;
in the wireless communication network, identifying the user communication system identifier based on the association of the user communication system identifier with the content network identifier and the media content identifiers in the media request; and
wherein wirelessly transferring the media content identifiers to the wireless communication device comprises performing the transfer if the wireless communication device identifier in the media request is associated with the user communication system identifier.

7. The method of claim 1 wherein the media content identifiers comprise uniform resource identifiers.

8. The method of claim 1 wherein the content network identifier indicates a Digital Living Network Alliance (DLNA) content network.

9. The method of claim 1 wherein the wireless communication network comprises a Long Term Evolution (LTE) network.

10. A communication system to wirelessly transfer media content identifiers to a wireless communication device, the communication system comprising:
a data distribution network configured to receive content inventory data associating the media content identifiers with a content network identifier and a content user identifier;
a wireless communication network configured to wirelessly receive a user service registration indicating the content network identifier, the content user identifier, and content-delivery footprint data, and responsively transfer the content network identifier, the content user identifier, and the content delivery footprint data for delivery to the data distribution network;
the data distribution network configured to receive the content network identifier and the content user identifier and responsively identify the media content identifiers associated with the content network identifier and the content user identifier by the content inventory data and transfer the media content identifiers associated with the content network identifier and the content user identifier for delivery to the wireless communication network;
the wireless communication network configured to receive the media content identifiers associated with the content network identifier and the content user identifier and associate the content-delivery footprint data for the user communication system with the media content identifiers associated with the content network identifier and the content user identifier, wirelessly receive a media request from the wireless communication device indicating the content network identifier and the content user identifier, and in response, and wirelessly transfer the media content identifiers associated with content network identifier and the content user identifier to the wireless communication device.

11. The communication system of claim 10 wherein the wireless communication network is configured to wirelessly receive a content request from the wireless communication device indicating one of the media content identifiers and responsively identify a network address for the one of the media content identifiers based on the association of the one of the media content identifiers with the content-delivery footprint data for the user communication system, and forward the content request to the user communication system with the network address and the one of the media content identifiers.

12. The communication system of claim 10 wherein the wireless communication network is configured to wirelessly receive a content request from the wireless communication device indicating one of the media content identifiers, identify a network address for the one of the media content identifiers based on the association of the one of the media content identifiers with the content-delivery footprint data for the user communication system, and transfer a redirect request to the wireless communication device indicating the network address for the one of the media content identifiers.

13. The communication system of claim 10 wherein the content-delivery footprint data indicates Internet Protocol address translations used in the wireless communication network for the user communication system.

14. The communication system of claim 10 wherein:
the data distribution network is configured to receive the content inventory data transferred by a user communication system and indicating a user communication system identifier associated with the content network identifier;
the wireless communication network is configured to the user service registration transferred by the user communication system indicating the user communication system identifier associated with the content network identifier and transfer the user communication system identifier along with the content network identifier to the data distribution network; and
the data distribution network is configured to receive the user communication system identifier along with the content network identifier and identify the media content identifiers associated with the user communication system identifier and the content network identifier and the content user identifier.

15. The communication system of claim 10 wherein the wireless communication network is configured to:
associate a user communication system identifier for a user communication system with a wireless communication device identifier for the wireless communication device;
receive the user communication system identifier in the user service registration transferred by the user communication system and associate the user communication system identifier with the media content identifiers based on the content network identifier;
receive the wireless communication device identifier in the media request transferred by the wireless communication device and identify the user communication system identifier based on the association of the user communication system identifier with the content network identifier and the media content identifiers in the media request; and
transfer the media content identifiers to the wireless communication device if the wireless communication device identifier in the media request is associated with the user communication system identifier.

16. The communication system of claim 10 wherein the media content identifiers comprise uniform resource identifiers.

17. The communication system of claim 10 wherein the content network identifier indicates a Digital Living Network Alliance (DLNA) content network.

18. The communication system of claim 10 wherein the wireless communication network comprises a Long Term Evolution (LTE) network.

* * * * *